United States Patent [19]
Jäger

[11] Patent Number: 5,725,084
[45] Date of Patent: Mar. 10, 1998

[54] CONVEYOR BELT, COMPRISED OF PARALLEL BELTS AND TRANSVERSELY EXTENDING RODS CONNECTED THERETO, FOR AGRICULTURAL MACHINES

[76] Inventor: Sebastian Jäger, Borchersstr. 2, D-30559 Hannover, Germany

[21] Appl. No.: 749,985

[22] Filed: Nov. 15, 1996

[51] Int. Cl.⁶ .................................................. B65G 15/54
[52] U.S. Cl. ........................................ 198/848; 198/731
[58] Field of Search ................................. 198/848, 731, 198/803.01, 803.14, 465.1

[56] References Cited

U.S. PATENT DOCUMENTS

| 2,276,978 | 3/1942 | Hyman et al. | 198/731 X |
| 2,544,191 | 3/1951 | Tomfohrde | 198/731 |
| 5,358,095 | 10/1994 | Luri | 198/848 X |

*Primary Examiner*—James R. Bidwell
*Attorney, Agent, or Firm*—Robert W. Becker & Associates

[57] ABSTRACT

A conveyor belt for a conveying device is movable in a longitudinal direction thereof on the conveying device and includes at least two pull-resistant, parallel belts extending in the longitudinal direction of the conveyor belt. Bending-resistant rods are connected perpendicularly to the at least two parallel belts so as to be spaced apart from one another. Follower members, including a base with an upper portion and a lower portion, are provided for entraining goods to be conveyed on the conveyor belt. The follower members are connected with the base to the rods such that the upper portion is positioned above the conveying plane of the rods and the lower portion is positioned below the conveying plane. The upper portion and the lower portion are connected to one another with an interlocking hook connection.

16 Claims, 1 Drawing Sheet

CONVEYOR BELT, COMPRISED OF PARALLEL BELTS AND TRANSVERSELY EXTENDING RODS CONNECTED THERETO, FOR AGRICULTURAL MACHINES

BACKGROUND OF THE INVENTION

The invention relates to a conveyor belt for conveying devices, especially for agricultural implements, whereby the longitudinally movable conveyor belt comprises two or more pull-resistant, parallel belts extending in the longitudinal direction of the conveyor belt which are connected to one another by rods extending transverse to the parallel belts and being spaced from one another. To the rods are connected follower members for conveying the goods to be conveyed which comprise a base with an upper and a lower portion. The upper portion extends above the rods and the lower portion extends below the rods. The upper and lower portions are positive-lockingly connected to one another.

In known conveyor belts of this type (German Patent Application 33 18 735) the positive locking engagement is provided by a curved projection at one portion which engages a flat groove at the other portion. The portions for mounting the follower members are opened in order to be able to remove the follower member simply by elastically deforming the portions. Fastening means such as pins, screws or clamping means may be provided in order to ensure safe securing of the portions to one another.

It is therefore an object of the present invention to provide a special type of connection for the follower member which ensures, while making obsolete the aforementioned fastening means, a sufficiently stable connection of the base to the rods of the conveyor belt.

SUMMARY OF THE INVENTION

The conveyor belt for a conveying device movable in a longitudinal direction thereof in the conveying device according to the present invention is primarily characterized by:

At least two pull-resistant, parallel belts extending in the longitudinal direction of the conveyor belt;

Bending-resistant rods connected perpendicularly to the at least two parallel belts so as to be spaced apart from one another;

Follower members, comprising a base with an upper portion and a lower portion, for entraining goods to be conveyed on the conveyor belt;

The follower members connected with the base to the rods such that the upper portion is positioned above the conveying plane defined by rods and the lower portion is positioned below the conveying plane;

The upper portion and the lower portion connected to one another with an interlocking hook connection.

Preferably, the interlocking hook connection, when closed, is under tensile load.

Advantageously, the base has a first and a second opposite sides. The upper portion and the lower portion are pivotably connected to one another at the first side. The interlocking hook connection is located at the second side.

Preferably, the upper portion and the lower portion consist of an elastic, deformable material and have a unitary transition at the first side. The unitary transition has a reduced wall thickness in order to pivotably connect the upper portion and the lower portion.

When the interlocking hook connection is released, the upper portion and the lower portion extend angularly to one another. The angle between the upper portion and the lower portion is preferably 30° to 40°.

Advantageously, the follower members have a longitudinal extension perpendicular to the parallel belts. The interlocking hook connection comprises first and second hook members in the form of a ledge having a length identical to the longitudinal extension of the follower members.

The follower members comprise a follower element detachably connected to the base.

Either the base or the follower element has an undercut, longitudinal groove and the other one has a longitudinal projection having a cross-sectional contour matching the cross-sectional contour of the groove. The longitudinal projection engages the groove for detachably connecting the base and the follower element.

The cross-sectional contour of the groove and of the projection is preferably hammer head-shaped or dovetail-shaped.

The length of the follower element, in the direction perpendicular to the longitudinal direction of the conveyor belt, is greater than a length of the base such that at least one end of the follower element is positioned above one of the parallel belts.

The length of the follower element is preferably substantially identical to the width of the conveyor belt.

The conveyor belt may comprise at least three parallel belts, and at least one of the parallel belts in the central area of the conveyor belt is bridged by the follower element.

The upper portion and the lower portion enclose at least two of the rods and extend in the longitudinal direction of the conveyor belt into the proximity of neighboring ones of the at least two rods or up to the neighboring ones of the at least two rods.

Thus, according to the present invention it is suggested to hook the two portions of the base interlockingly to one another whereby expediently an interlocking hook connection is employed that is, when closed, under tensile load. Furthermore, it is expedient to provide such a hook connection only at one side of the two portions positioned above one another and to provide at the other side a pivotable connection where the two portions have a unitary transition into one another.

Such a hook connection can be engaged quickly and it can be ensured that a sufficiently stable anchoring of the base results. Thus, no additional fastening means in the form of screws etc. are required.

The tensile load on the hook connection can be achieved preferably by manufacturing the follower member, respectively, its base by continuous extrusion such that the portions, after solidification of the material, are arranged at an angle to one another. For mounting on the rods, the portions must be brought into parallel position whereby tension is introduced within the pivot connection between the portions which tension causes the desired tensile load at the opposite side of the portions where the hook connection is located.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
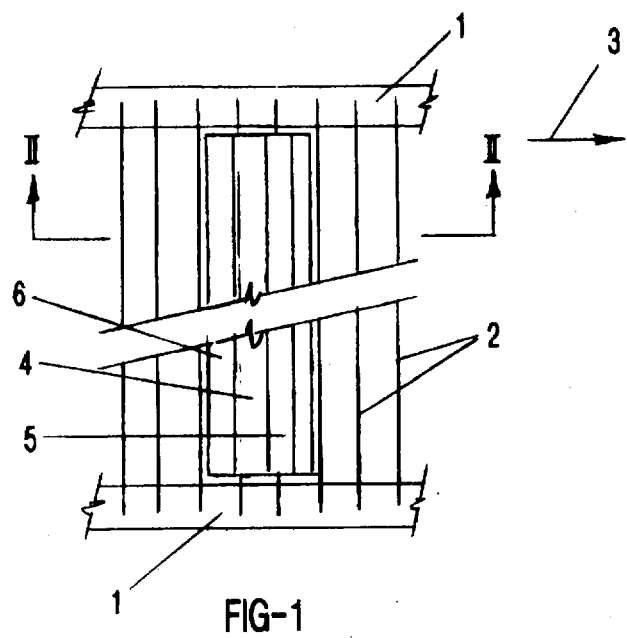
FIG. 1 shows a partial top view of the conveyor belt for agricultural implements.
Figure 2:
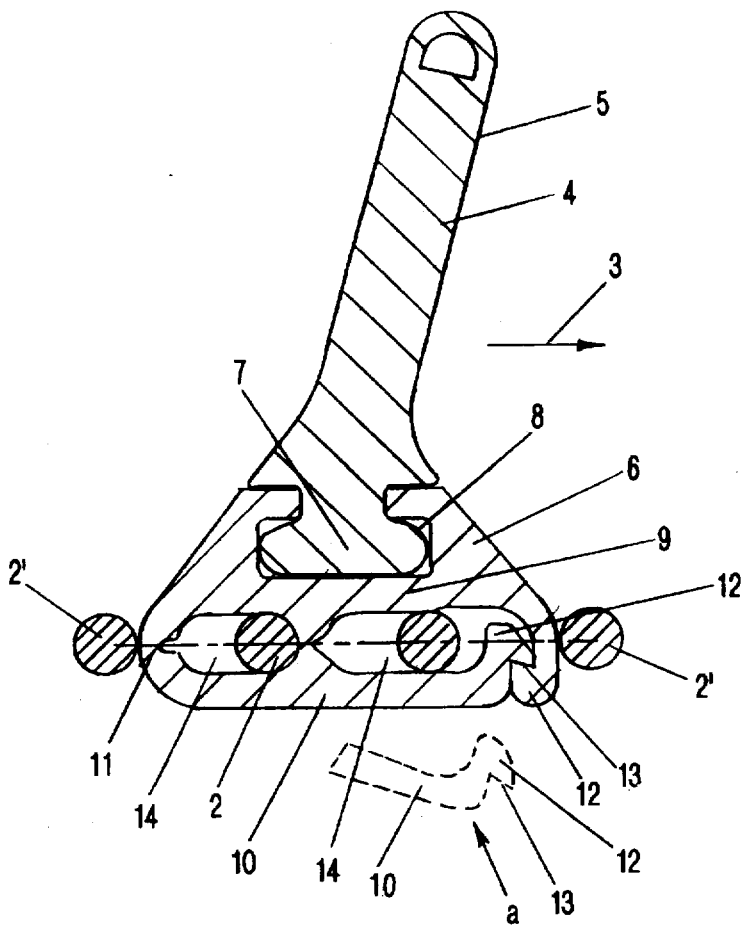
FIG. 2 shows a section along the line II—II of FIG. 1 with the belts being omitted.

The present invention will now be described in detail with the aid of a specific embodiment utilizing FIGS. 1 and 2.

The conveyor belt is comprised substantially of two parallel belts 1 which are connected to one another with a plurality of parallel rods 2 extending perpendicular to the belts 1. In the conveying device of agricultural implements the conveyor belt is moved in the direction of arrow 3.

The belts 1 are pull-resistant but flexible. They can be manufactured of any suitable material. Optionally, they can also be comprised of individual members. However, fabric-reinforced elastomeric belts are preferably used. The rods 2 are bending-resistant and stiff. They are conventionally manufactured of steel. The connection between the rods 2 and the belts 1 should be secure and reliable. In most cases rivet connections are used.

The rods 2 which are spaced from one another allow to a certain extent screening of material in agricultural implements. In order to be able to fulfill further tasks, the conveyor belts according to the present invention are provided with follower members 4 extending transverse to the longitudinal direction of the conveyor belt, i.e., in the direction of extension of the rods 2. The follower members can be of any suitable design. The follower members 4 comprise a follower element 5 which, in the direction of conveying, is slightly bent forward and is supported by a base 6 that is connected to the conveyor belt, respectively, to its rods 2. The parts 5, 6 are profiled members. They extend practically from one belt 1 to the oppositely arranged belt 1 and are made of tenacious and tough plastic or rubber.

The stay-like follower elements 5 have a hammer head-shaped or a dovetail-shaped longitudinally extending projection 7 engaging a correspondingly shaped undercut, longitudinal groove 8 of the base 6. The projection 7 is slidingly inserted into the groove 8. The resulting positive-locking engagement (optionally, a frictional engagement can be provided) secures a sufficiently stable connection of the projection 7 to the base 6. However, this has the advantage that the parts 5, 6 can be assembled in any desired manner and can be detached from one another, for example, after excessive wear or for the purpose of mounting or demounting.

The base 6 surrounds two rods 2 and extends to the rods 2' which are positioned adjacent to the enclosed rods 2. Above the rods 2 (i.e., above the center line extending through the rods and shown in a dashed line) an upper portion 9 provided with the groove 8 is positioned and below the rods 2 a lower portion 10 is provided. At one side at the location indicated by reference numeral 11 the upper and lower portions 9, 10 have a unitary transition into one another. At this location 11 the wall thickness is reduced in order to allow a pivoting movement of the portions 9, 10 relative to one another. At the opposite end, the two portions 9, 10 are provided with integrally shaped hooks 12 which have an undercut surface 13. In the mounted state, the hooks 12 engage one another and secure thus the base 6 on the rods 2. In order to make the hook connection especially safe, the hook connection 12, 13 is under tensile load. The undercut surfaces 13 thus rest with stress on one another. In order to be able to provide this tensile load, the profiled member forming the base 6 is manufactured such that the two portions 9, 10 are positioned at an angle of, for example, 30° to 40° relative to one another. Compare the illustration (detail A) at the lower part of FIG. 2 showing in dash-dotted lines the relative angular position of portion 10. For mounting, the two portions 9, 10 are moved toward one another whereby the hook connection is established. This is done under elastic deformation at location 11 in order to thus introduce into the portions an elastic tension which is directed in the open direction of the hook connection. A hook connection under tensile load can also optionally be realized by producing the portions 9 and/or 10 so as to be curved and by removing the curvature during hooking (by elastic deformation of the portions).

As can be seen in the drawing, the two sections 9, 10 provide receiving chambers 14 for a respective rod 2. The receiving chambers are in the form of slotted holes which are required for kinematic reasons.

The hook connection of the portions 9, 10 is so reliable that additional securing and fastening means are obsolete. Also, further additional manipulation is not required once the hook connection has been established.

It is furthermore within the inventive concept to select the length of the follower elements 5 to be larger in comparison to the length of the corresponding base 6 such that at least one end of the follower elements 5 (in a top view) is positioned above one of the belts 1. Preferably, the length of the follower element 5 is selected such that both ends of the follower element 5 are positioned above the belts 1 in order to provide the greatest possible active surface for the follower element 5. In the case that three or more belts 1 are used, the length of the follower element 5 can be selected such that one or more belts I within the central area of the conveyor belt are bridged by the follower element 5. The base 6 is then located only within the free portions of the rods 2 while the follower element 5 extends practically over the entire width of the conveyor belt. It should be noted that this embodiment of the follower element 5 can also be used for such conveyor belts in which the base 6 is connected to the rods 1 without the use of a hook connection, the base 6 is connected in any other suitable manner.

The present invention is, of course, in no way restricted to the specific disclosure of the specification and drawings, but also encompasses any modifications within the scope of the appended claims.

What I claim is:

1. A conveyor belt for a conveying device, said conveying belt moveable in a longitudinal direction thereof on the conveying device and comprising:

at least two pull-resistant, parallel belts extending in a longitudinal direction of said conveyor belt;

bending-resistant rods connected perpendicularly to said at least two parallel belts so as to be spaced apart from one another;

follower members, comprising a base with an upper portion and a lower portion, for entraining goods to be conveyed on said conveyor belt;

said follower members connected with said base to said rods such that said upper portion is positioned above a conveying plane defined by said rods and said lower portion is positioned below said conveying plane;

said upper portion and said lower portion connected to one another with an interlocking hook connection.

2. A conveyor belt according to claim 1, wherein said interlocking hook connection, when closed, is under tensile load.

3. A conveyor belt according to claim 2, wherein:

said base has a first and a second opposite sides;

said upper portion and said lower portion are pivotably connected to one another at said first side; and said interlocking hook connection is located at said second side.

4. A conveyor belt according to claim 3, wherein:

said upper portion and said lower portion consist of an elastic, deformable material and have a unitary transition at said first side; and said unitary transition has a reduced wall thickness in order to pivotably connect said upper portion and said lower portion.

5. A conveyor belt according to claim 4, wherein, when said interlocking hook connection is released, said upper portion and said lower portion extend angularly to one another.

6. A conveyor belt according to claim 5, wherein an angle between said upper portion and said lower portion is 30° to 40°.

7. A conveyor belt according to claim 1, wherein:

said follower members have a longitudinal extension perpendicular to said parallel belts;

said interlocking hook connection comprises first and second hook members in the form of a ledge having a length identical to said longitudinal extension of said follower members.

8. A conveyor belt according to claim 1, wherein said follower members comprise a follower element detachably connected to said base.

9. A conveyor belt according to claim 8, wherein one of said base and said follower element has an undercut, longitudinal groove and the other one of said base and said follower element has a longitudinal projection having a cross-sectional contour matching a cross-sectional contour of said groove, wherein said longitudinal projection engages said groove for detachably connecting said base and said follower element.

10. A conveyor belt according to claim 9, wherein said cross-sectional contour of said groove and of said projection are hammerhead-shaped.

11. A conveyor belt according to claim 9, wherein said cross-sectional contour of said groove and of said projection are dovetail-shaped.

12. A conveyor belt according to claim 8, wherein a length of said follower element, in a direction perpendicular to said longitudinal direction of said conveyor belt, is greater than a length of said base such that at least one end of said follower element is positioned above one of said parallel belts.

13. A conveyor belt according to claim 12, wherein said length of said follower element is identical to a width of said conveyor belt.

14. A conveyor belt according to claim 12, comprising at least three of said parallel belts and wherein at least one of said parallel belts in a central area of said conveyor belt is bridged by said follower element.

15. A conveyor belt according to claim 1, wherein said upper portion and said lower portion enclose at least two of said rods and extend in said longitudinal direction of said conveyor belt to neighboring ones of said at least two rods.

16. A conveyor belt according to claim 1, wherein said upper portion and said lower portion enclose at least two of said rods and extend in said longitudinal direction of said conveyor belt at least into proximity of neighboring ones of said at least two rods.

* * * * *